United States Patent [19]

Hoffmann et al.

[11] 3,805,162

[45] Apr. 16, 1974

[54] MINIATURE, LOW VOLTAGE, LOW CURRENT RECEIVER FRONT END

[75] Inventors: Clive Hoffmann, San Diego, Calif.; James McDonald, Downers Grove, Ill.

[73] Assignee: Motorola, Inc., Franklin Park, Ill.

[22] Filed: Oct. 27, 1972

[21] Appl. No.: 301,610

Related U.S. Application Data

[63] Continuation of Ser. No. 180,719, Sept. 15, 1971, abandoned.

[52] U.S. Cl. .................... 325/318, 325/492, 330/18

[51] Int. Cl. .................... H04b 1/24

[58] Field of Search .......... 325/318, 319, 441, 443, 325/450, 451, 492; 330/18, 19, 22; 332/59, 60

[56] References Cited

UNITED STATES PATENTS

| | | | |
|---|---|---|---|
| 2,811,590 | 10/1957 | Doremus et al. | 325/318 X |
| 2,926,307 | 2/1960 | Ehret | 330/25 |
| 2,957,979 | 10/1960 | Kammer | 325/318 |
| 2,929,025 | 3/1960 | Wilhelmsen | 330/18 |
| 2,994,767 | 8/1961 | Rhodes | 325/319 |
| 3,042,870 | 7/1962 | Minner et al. | 325/451 |
| 3,510,579 | 5/1970 | Marsh, Jr. | 330/18 |

*Primary Examiner*—Benedict V. Safourek
*Attorney, Agent, or Firm*—George Aichele

[57] ABSTRACT

A receiver RF section or front end is provided with a mixer stage and an RF amplifier stage connected in series with one another for direct current energization from a power source. The mixer stage includes a transistor, the base and emitter electrodes of which constitute the inputs of the mixer stage, and a control transistor has its base-emitter junction connected in parallel with the base-emitter junction of the transistor in the mixer stage. The DC voltage drop across the base-emitter junctions of these transistors is used to control the output of an oscillator transistor. The oscillator transistor has an output electrode thereof direct current coupled to the base electrode of the mixer transistor and the base electrode of the oscillator transistor is direct current coupled to an output electrode of the control transistor.

34 Claims, 4 Drawing Figures

MINIATURE, LOW VOLTAGE, LOW CURRENT RECEIVER FRONT END

This is a continuation division, of application Ser. No. 180,719, filed Sept. 15, 1971 now abandoned.

BACKGROUND OF THE INVENTION

This invention relates generally to radio receivers, and more particularly to RF sections of receivers. This application is a continuation-in-part of application Ser. No. 41,383, filed May 28, 1970 now abandoned.

Generally, receiver RF sections or front ends of radios, television and other devices used to receive radiated electro-magnetic energy, take various forms in the manner they receive and handle RF signal information received at their input. One common arrangement of receiver front end uses the well-known converter stage which operates as a combination oscillator and mixer, and cooperates with the RF signal information received to produce IF signal information of a desired frequency. This type of receiver front end, while having some drawbacks, is widely used because it is relatively inexpensive and requires less power to operate than does the conventional receiver front end which utilizes separate mixer and oscillator stages.

Another type of receiver front end includes RF amplifier stages with one or more stages of amplification to enhance the amplitude of a selected RF signal before it is combined with the local oscillator frequency at the mixer stage. Although receiver front ends which utilize one or more stages of RF amplification together with a separate oscillator circuit to combine frequencies in a separate mixer stage have improved operating characteristics over the converter-type receiver front end, they present a problem in that they are relatively expensive to manufacture and relatively large in size because of the use of coupling transformers between the respective stages of the receiver front end. Also, energizing current is applied to each of the stages of the receiver front end separately and independent of one another since each stage is connected in parallel with the other with respect to receiving energizing current from the power supply of the receiver. This causes a relatively high power consumption within the receiver. Also, the power consumption of the local oscillator within a receiver may be relatively high since there is no means to control the output amplitude of the oscillator frequency signal which is applied to the mixer stage. Therefore, the oscillator circuit also consumes a relatively large amount of power within the receiver. This relatively large consumption of power is of prime concern when operating receivers from a single battery cell where small cells offer limited power availability. These small battery cells will not last very long in prior art systems and then failure may come about at an inopportune moment or without the user being aware of the failure.

SUMMARY OF THE INVENTION

Accordingly, it is an object of this invention to provide a receiver front end wherein direct current coupling between various stages of the receiver eliminates the need of AC coupling devices between the respective stages thereof, thereby enabling the receiver front end to be made relatively inexpensively and small in size.

Another object of the invention is to provide a receiver front end whereby the total current flow through the respective stages of the receiver front end is reduced, thereby reducing the power requirements of the receiver.

Yet another object of this invention is to provide a radio receiver that will operate efficiently for long periods of time when powered by a small battery cell such as a mercury button cell.

One feature of the receiver front end of this invention is a direct current series coupling between the mixer stage and the RF amplifier stage of the receiver such that current flow from the power supply of the receiver is common between these two stages during operation thereof. This common current flow, or sharing of current, between these two stages of the receiver front end reduces the total power consumption of the receiver and enables the receiver to operate for much longer periods of time on battery power supplies, or the like.

Another feature of this invention is the use of a direct current coupling between the output of the local oscillator of the receiver and one of the inputs of the mixer stage.

Yet another feature of the invention is the use of a control transistor for controlling the operation of the oscillator of the receiver front end, and where the control transistor has its emitter-base junction connected in parallel with the emitter-base junction of the transistor in the mixer stage with respect to DC current.

Briefly, the receiver front end of this invention includes an RF amplifier stage including a transistor which has its base electrode direct current coupled to the input circuit of the receiver for receiving the RF signal information. The collector electrode of this transistor is direct current coupled to an emitter electrode of a transistor within the mixer stage and this direct current coupling is preferably through a tapped inductance element. The inductance element, together with a capacitor connected in parallel therewith, form a tank circuit for the RF amplifier stage. The tap on the inductance element is bypassed for RF signals and the position of the tap is selected so that inductance element matches the impedance at the output of the RF amplifier stage to the impedance at one input of the mixer stage. The tapped inductor also provides a phase reversal, and the end thereof remote from the collector of the RF stage is coupled to the base electrode of such stage for neutralization.

A local oscillator stage is provided with a transistor, and the collector electrode thereof is direct current coupled to the base electrode of the transistor of the mixer stage to supply the necessary oscillator frequency to combine properly with the RF signal information applied to the emitter electrode of the mixer transistor to develop the desired IF signal frequency at the output of the mixer stage. The amplitude of the oscillator signal applied to the base electrode of the mixer transistor is controlled by a control transistor which is direct current coupled between the mixer stage and oscillator stage of the receiver front end. Preferably, the control transistor has the base electrode thereof direct current coupled to the emitter electrode of the mixer transistor, and the emitter electrode of the control transistor is direct current coupled to the base electrode of the mixer transistor, such that the base-emitter junctions of the control transistor and mixer transistor are connected in parallel with respect to a DC current path. The transistor within the mixer stage has a DC voltage drop across the base-emitter junction thereof which is greater than the DC voltage drop across the base-emitter junction of the control transistor, to cause a relatively high conduction state of the control transistor which, in turn, causes a high amplitude output of the oscillator transistor to couple a high amplitude oscillator signal to the base electrode of the mixer transistor. However, the signal developed across the base-emitter junction of the mixer transistor will cause reduction in the average DC voltage drop across the base-emitter junction of the mixer transistor, which voltage drop is a function of the amount of oscillator signal injected into the mixer stage. This signal injection dependent voltage drop will cause a reduction of current flow through the control transistor which, in turn, reduces the signal amplitude of the oscillator frequency signal at the oscillator.

Bypass capacitors connected to one or more of the stages within the receiver front end are coupled back to the power supply to the receiver rather than to ground potential or some other common reference potential. This enables signal developing resistors to be connected between each of the transistors in the stage and ground potential, or the common reference potential, and the signal information can be tapped off of these resistors without complicated circuitry.

In one embodiment of this invention the output of the mixer stage is connected to a tank circuit comprising an inductance element and a capacitance element, and the output signal developed across this tank circuit is direct current coupled to the base electrode of an IF amplifier transistor.

In another embodiment of this invention the output of the mixer transistor is connected to a resistor which has a capacitor connected in parallel therewith. In this case also direct current coupling is used between the resistance-capacitance network and the input of the IF amplifier stage. In the case where the resistor is used, rather than an inductor, at the output of the mixer stage the resistor serves a dual function in that it provides means for developing the IF signal thereacross to be applied to the IF amplifier stage and also serves as a current limiting resistor for the series connected mixer transistor and RF amplifier transistor.

DESCRIPTION OF THE PREFERRED EMBODIMENT

Figure 1:
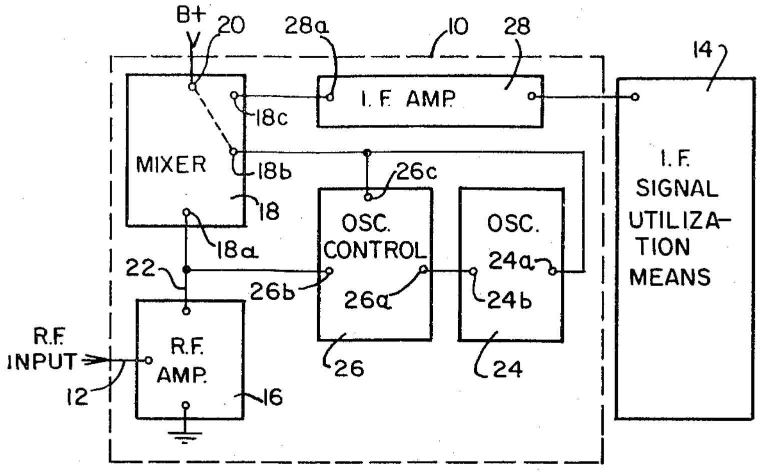
FIG. 1 is a simplified block diagram of a receiver front end constructed in accordance with this invention.

Referring now to FIG. 1 there is seen a block diagram of a receiver front end which is designated generally by reference numeral 10. The receiver front end 10 has input means 12, which may be connected to an antenna, for receiving RF signal information radiated from any suitable transmitting station, and which may be of any desired frequency. The RF signal information is converted to an IF signal, in a manner to be described, and applied to an IF signal utilization means 14 which may take any form, and which forms no part of this invention.

An RF amplifier stage 16 receives and amplifies the RF signal information from the input means 12 and applies it to an input 18*a* of a mixer stage 18. Operating potential from a B+ supply is applied to an input terminal 20 of the mixer stage 18 and common current flow will pass through the mixer stage 18 and through the RF amplifier stage 16 as a result of a direct current coupling 22 which connects the output of the RF amplifier stage 16 to the input 18a of the mixer stage 18. This direct current series coupling between the mixer stage and the RF amplifier stage substantially reduces the current requirement for operating these stages as compared to the current requirement if they were operated by independent current paths as is usually the case. That is, current flow from the B+ source which passes through the mixer stage 18 is also common with the current flow passing through the RF amplifier stage 16 thus resulting in a substantial saving in a power dissipation in operating these two stages.

A local oscillator circuit 24 has its output terminal 24*a* direct current coupled to a second input 18*b* of the mixer stage 18 so that the RF signal and the oscillator signal will be heterodyned within the mixer stage to produce a difference frequency which is the desired IF frequency. By providing direct current coupling between the output terminal 24*a* of the oscillator 24 and the second input terminal 18*b* of the mixer stage 18, a saving in AC coupling components is realized, i.e., the use of transformer coupling is eliminated. This direct current coupling together with the direct current coupling between the mixer 18 and the RF amplifier 16 enables the receiver front end 10 to be made relatively small in size with a minimum of components and at a substantially reduced cost, as compared to receiver front ends known heretofore.

To insure that the signal level applied to the input terminal 18*b* of the mixer 18 is of the proper value, an oscillator control circuit 26 has an output terminal 26*a* thereof direct current coupled to an input terminal 24*b* of the oscillator 24 to control the amplitude of oscillations of the oscillator. This control of amplitude of the oscillator frequency signal is obtained by a parallel direct current connection of the input terminals 26*b* and 26*c* with that of the input terminals 18*a* and 18*b*, respectively, of the mixer stage 18. The oscillator control circuit 26 is then controlled in response to the potential across terminals 18*a* and 18*b*, which, in turn, is of a value porportional to the amount of signal injected into the mixer stage 18. For example, when the signal level from the output of the oscillator 24 is much higher than the signal level from the RF amplifier 16, the potential across terminals 18*a* and 18*b* will decrease to correspondingly decrease the output signal from the oscillator control circuit 26 which, in turn, decreases the amplitude of the signal of the oscillator circuit 24. This novel circuit arrangement provides a closed loop feedback responsive to signal injection at the mixer stage 18 so as to always provide the proper signal levels between the RF frequency signal at terminal 18*a* and the oscillator frequency signal at terminal 18*b* to obtain proper mixing of the signals to develop the desired IF signal frequency information.

An IF amplifier stage 28 has its input terminal **28*a* direct current coupled to output terminal 18*c* of the mixer stage 18 to amplify the IF signal and apply it to the IF signal utilization means 14. However, it will be understood that the IF amplifier stage 28 may be incorporated within the IF signal utilization means 14,** if desired.

Figure 2:
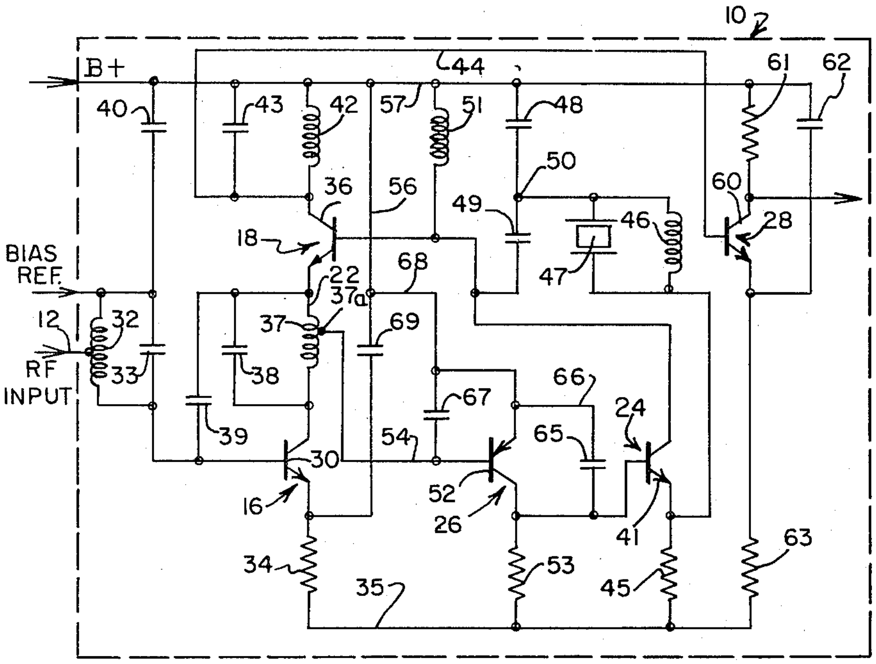
FIG. 2 is a detailed schematic wiring diagram of one embodiment of the receiver front end in accordance with this invention.

Referring now to FIG. 2, there is seen a detailed schematic diagram of the receiver front end 10 illustrating one preferred arrangement of direct current coupling between the various stages of the receiver front end. Here it can be seen that the RF amplifier stage 16 includes a transistor 30, illustrated as an NPN type, with its base electrode direct current coupled to the input terminal 12 via a line 31 and a portion of an inductance element 32. A capacitor 33 is connected in parallel with the inductance element 32 to form a tank circuit which is tuned to a frequency corresponding to the desired incoming RF frequency signal information. The capacitor 33 is here illustrated as being of a fixed capacitance value, but it will be understood that a variable capacitor may be used so as to provide a tuned input circuit which can be varied in frequency within a given frequency range. In the alternative, the inductance element 32 may be variable to provide the necessary variable tuning of the tank circuit. A resistor 34 is connected between the emitter electrode of transistor 30 and a line 35, the line 35 being the common reference potential such as ground potential.

The mixer stage 18 comprises a transistor 36, here being illustrated as NPN type, having its emitter electrode direct current coupled to the collector electrode of transistor 30 via the line 22. Preferably, an inductance element 37 is interposed in the line 22 having a tap 37a connected through bypass capacitor 67 to the B+ distribution line 57. The tap **37*a* is, therefore, at a fixed potential with respect to RF signals. The inductance element 37 has connected in parallel therewith a capacitor 38 to form a tank circuit resonant at the frequency developed within the RF amplifier stage 16. The tap 37 is positioned to match the output impedance of the transistor 30, at the collector electrode thereof, with the input impedance of the transistor 36, at the emitter electrode thereof. As the collector impedance of transistor 30 will be greater than the emitter impedance of transistor 36, the tap will be nearer to the emitter electrode than the collector electrode. Therefore, impedance matching to the input of the base of transistor 30 is accomplished by the tank circuit formed by the inductance element 32 and capacitor 33, and impedance matching at the output of transistor 30 is accomplished by the inductance element 37 and capacitor 38.**

By utilizing the tank circuit formed by tapped inductance element 37 and capacitor 38 within the direct current path between transistors 30 and 36, phase reversal of the signal developed by the RF amplifier stage 16 with respect to the RF reference potential, takes place in the inductance element 37, and this signal is coupled to the base of transistor 30 for neutralizing the base to collector capacitance thereof. This coupling is through capacitor 39 which has one end connected to the base electrode of transistor 30 and the other end connected to the collector electrode of transistor 30 via the inductance element 37. The base electrode of transistor 30 is connected to a bypass capacitor 40 through the inductance element 32, and the other end of this bypass capacitor is connected to the B+ line 57 of the receiver, rather than to ground potential or the reference potential at line 35.

Large received signals can act to overload the mixer stage. The RF amplifier transistor will limit on large signals and may provide the protection needed. If further protection is required, a diode can be connected across the tuned circuit including inductor 37 and capacitor 38 to limit the signal developed thereacross.

The oscillator circuit 24 includes a transistor 41, illustrated as an NPN type, with the collector electrode thereof direct current coupled to the base electrode of the transistor 36 of the mixer stage 18. The direct current coupling between the oscillator circuit 24 and the mixer stage 18 eliminates the need of AC coupling device such as capacitors or transformers or the like. The oscillator signal at the base electrode of transistor 36 together with the RF frequency signal information at the emitter electrode of transistor 36 are combined to develop a difference frequency signal of the desired intermediate frequency. This IF signal information is then developed at the base to emitter junction of transistor 36 and amplified in this transistor, with the amplified signal appearing in the tank circuit formed by inductance element 42 and capacitor 43 connected to the collector electrode of transistor 36. The IF signal information developed at the output of mixer stage is then direct current coupled to the IF amplifier stage 28 via line 44.

The transistor 41 of the oscillator circuit 24 has the emitter electrodes thereof connected to the line 35 through a resistor 45. The emitter electrode of transistor 41 is also connected to a tank circuit comprising an inductance element 46 and a piezoelectric element 47 thereby forming a crystal controlled oscillator with the transistor 41. Connected to the inductance element 46 and the piezoelectric element 47 are a pair of capacitors 48 and 49 which are tied together at a circuit point 50, and an inductance element 51 is connected in parallel with the capacitors 48 and 49. Although, the transistor 41 together with the piezoelectric element 47 form a crystal controlled oscillator of a fixed frequency, it may be desirable to provide a variable frequency oscillator which tracks a variable frequency input tuned circuit connected at the input terminal 12 so that the receiver front end 10 may receive the given band of frequencies.

Considering now the operation of the RF amplifier circuit including transistor 30, the mixer circuit including transistor 36 and the local oscillator circuit including transistor 41, as in the usual superheterodyne radio receiver, the received radio frequency signal and the local oscillator signal are both at much higher frequencies than the intermediate frequency signals. The RF amplifier includes a tank circuit formed by inductor 37 and capacitor 38 which provides a high collector impedance and results in effective amplification of the received RF signal. A tuned circuit formed by inductor 42 and capacitor 43 connected to the collector of mixer transistor 36 provides substantially a short circuit at received RF frequency, and a tuned circuit formed by coil 51 and capacitors 48 and 49 connected to the base of transistor 36, also has low impedance at the RF frequency. Accordingly, the base and collector of transistor 36 are at the B+ potential, and this transistor acts as a diode with the impedance of the base emitter junction being relatively low. As previously stated, the tap 37*a* on inductance element 37 is positioned to match the relatively high collector impedance of transistor 30 to the low emitter impedance of transistor 36.

With respect to the local oscillator signal, the base of transistor 36 to which the local oscillator signal is applied has a relatively high impedance, so that the local oscillator is not substantially loaded thereby. The emitter impedance of transistor 36 is quite low, since the tap 37*a* is positioned so that only a small portion of the inductance element 37 is between the emitter and the RF reference potential provided by capacitor 67. The impedance of the tank circuit of 42, 43 connected to the collector of transistor 36 is quite low at the local oscillator frequency, as well as at the RF frequency.

Considering the mixing action in transistor 36, with the RF signal applied to the emitter and the local oscillator signal applied to the base, mixing action takes place in the emitter-base junction of transistor 36, and the intermediate frequency signal is developed thereby. The tank circuit including inductor 42 and capacitor 43 has a relatively high impedance at the intermediate frequency and the amplified intermediate frequency signal appears across this circuit. The circuit arrangement described permits operation of the radio frequency amplifier, local oscillator and mixer from a very low voltage, of the order of 1.2 volts, and provides very low current drain.

The oscillator control circuit 26 includes a transistor 52, illustrated as a PNP type, with the collector electrode thereof connected to the line 35 via a resistor 53. The base-emitter junction of transistor 52 is effectively connected in parallel with the base-emitter junction of transistor 36 of the mixer stage 18 for direct current and low frequency signals, and transistor 52 will conduct in response to the voltage difference between the two inputs of the mixer stage, i.e., signals at the base and emitter of transistor 36, correspondingly to control the amplitude of the output signal of the oscillator circuit 24. That is, the base electrode of transistor 52 is connected to a center tap 37*a* on the inductance element 37 via a line 54 and therefrom to the emitter electrode of transistor 36. The emitter electrode of transistor 52 is connected to the base electrode of transistor 36 via line 56, B+ line segment 57, and the inductance element 51, where the line segment 57 forms part of a B+ distribution line to the various components of the receiver front end 10. Since the transistor 52 of the oscillator control circuit 26 is used as a DC operated control device to control the output level of the oscillator circuit 24, the connection to the base electrode of transistor 36 via a portion of the B+ distribution line, i.e., the line segment 57, is readily utilized as a current path for its operation.

Preferably, transistor 36 of the mixer stage 18 is selected to be a high frequency transistor, which is a classification of transistors well-known in the art, while the transistor 52 of the oscillator control circuit 26 is selected to be a low frequency transistor. Therefore, the characteristic diode voltage developed across the base-emitter junction of transistor 36 will be greater than the characteristic diode voltage developed across the base-emitter junction of transistor 52, when given DC bias currents are maintained through the base-to-emitter junction of these transistors. In the illustrated embodiment, the characteristic diode voltage of transistor 36 may be in the order of 50 to 100 millivolts, more or less, greater than the characteristic diode voltage across the base-emitter junction of transistor 52, this voltage range being given only by way of example. When the circuit is first energized the oscillator 24 will operate at a relatively high level. However, upon application of a high frequency signal to the base electrode of transistor 36 from the output of the oscillator 24, the base-emitter voltage of transistor 36 will decrease to a level lower than the characteristic diode voltage drop across the base-emitter junction of transistor 52. This decrease in base-emitter voltage at the mixer transistor 36 correspondingly decreases the output of transistor 52 which, in turn, decreases the amplitude of the oscillator frequency signal from transistor 41. Hence, a closed loop feedback circuit is provided between the input and output terminals of the oscillator circuit 24 and is responsive to the level of signal injection at the mixer stage 18. This results in stable operation on the oscillator.

The IF amplifier stage 28 includes a transistor 60 which has the base electrode thereof connected to the line 44 to receive the IF frequency signal information developed at the output of mixer stage 18. A signal developing resistor 61 is connected between the collector electrode of transistor 60 and the B+ line 57, and the emitter electrode of transistor 60 is also connected to the line 57 through a bypass capacitor 62. A resistor 63 is connected between the emitter electrode of transistor 60 and the line 35 to provide an operating current path for the transistor 60.

It will be noted that all of the bypass capacitors that are used in the receiver front end 10 are connected back to the B+ line 57 rather than to ground potential or a reference potential at the line 35. For example, the base electrode of transistor 41 of the oscillator stage 24 has a bypass capacitor 65 connected to the B+ line via the line 66 and the line 56. Similarly, the base electrode of transistor 52 of the oscillator control circuit 26 has a bypass capacitor 67 connected to the B+ line through a line 68 and the line 56. The emitter electrode of transistor 30 of the RF amplifier stage 16 has a bypass capacitor 69 connected to the B+ line through the line 56. The tank circuit formed by the inductance element 42 and capacitor 43, together with the tank circuit formed by the capacitors 48 and 49 and the inductance element 51, provide operating potentials to transistors 36 and 41, respectively, and as such, the transistors 36 and 41 have their RF ground at the B+ connection. Therefore, by connecting all other bypass capacitors in the circuit to the B+ line, it enables each of the resistors 34, 53, 45 and 63 to become signal developing resistors so that direct current coupling, as for example between the collector electrode of transistor 52 and base electrode of transistor 41, is readily obtained without the use of AC coupling components.

Figure 3:
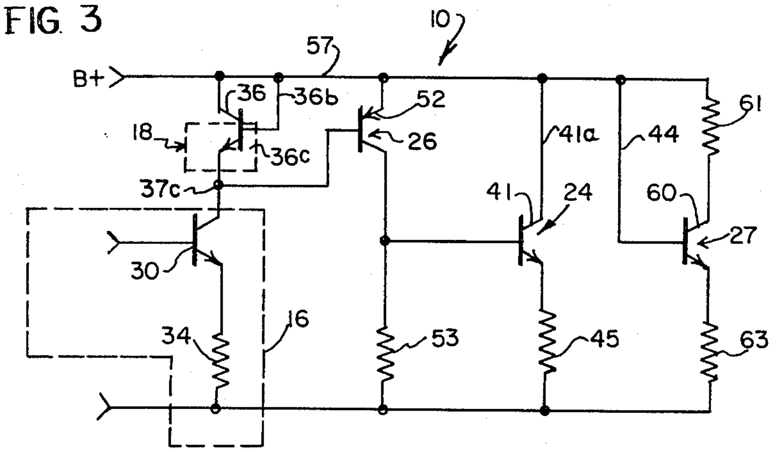
FIG. 3 is an equivalent DC circuit arrangement of the receiver front end of FIG. 2 illustrating the various direct current couplings between each of the transistors within the receiver front end.

Referring now to FIG. 3, there is seen a simplified schematic diagram of the circuit arrangement of FIG. 2 with only the direct current connections illustrated to facilitate a clearer understanding of the novel concepts of this invention. The components in FIG. 3 are designated by the same reference numerals as the corresponding components in FIG. 2 to facilitate a ready reference back to FIG. 2 to understand the operation of the circuit. A bias reference potential which may be from an external source, is applied to the base electrode of transistor 30 and its voltage value is selected to cause transistor 30 to conduct and develop a voltage of approximately 0.1 volt, more or less, across the resistor 34 in the emitter circuit of transistor 30. This arrangement will cause the transistor 30 to act as a current source for the mixer stage 18 with respect to direct current. The base-emitter junction of transistor 36 is here illustrated within a dotted line and is designated by reference numeral **36*a*. The base-emitter junction 36*a* is connected in parallel with the base-emitter junction of transistor 52, this parallel connection being a direct current connection. As mentioned hereinabove, transistor 36 is selected to be a high frequency transistor while transistor 52** is selected to be a low frequency transistor.

Since the base-emitter voltage drop across transistor 36 is in the order of 50–100 millivolts, greater than the base-emitter voltage drop across transistor 52, the transistor 52 will be rendered highly conductive. To achieve a higher voltage drop within the base-emitter circuit of transistor 36, it will be understood that a diode or resistor may be connected in series in the line **36*b* at the base electrode of transistor 36. In this case the transistors 36 and 52** may be of the same type, as desired.

Conduction of transistor 30 in response to the value of the bias reference voltage at the base thereof, will cause current flow to pass between the emitter-base junction of transistor 52 causing it to conduct. The state of conduction of transistor 52 may be relatively high because of the voltage drop across the base-emitter junction of transistor 36, and possibly may be conductive to a state of saturation. As a result of the direct current coupling between the collector electrode of transistor 52 and the base electrode of transistor 41, the transistor 41 will conduct to a value corresponding to the conduction of transistor 52, that is, high conduction state of transistor 52 will cause a corresponding high conduction state of transistor 41. Transistor 41 forms the oscillator transistor of the oscillator circuit 24 and high conduction of transistor 41 will produce a high amplitude output of the oscillator frequency signal applied to the base electrode of the mixer transistor 36. Referring back to the base-emitter junction 36a of transistor 46. the high frequency output of the oscillator circuit 24 which is applied to this junction causes the characteristic diode voltage developed thereacross to decrease with increasing amplitude of the oscillator frequency signal. Therefore, with an oscillator frequency signal present at the base emitter junction of transistor 36 the voltage drop across this junction is decreased, and can be decreased to a level lower than the voltage drop across the base-emitter junction of transistor 52. This action will tend to render transistor 52 nonconductive or substantially nonconductive resulting in a substantial reduction of current flow through the oscillator transistor 41 which, in turn, decreases the oscillator signal output to the base electrode of transistor 36. Therefore, there is provided a direct current coupling feedback loop between the oscillator transistor 41 and the mixer transistor 36, with the control transistor 52 connected in a manner to control current in the feedback loop. This feedback loop causes the high frequency output of the oscillator to be controlled continuously to a value to be just large enough to cause a characteristic diode voltage drop at the base-emitter junction of transistors 36 and 52 to be substantially equal. This being the condition which provides optimum operation of the oscillator circuit 24 with minimum current through the transistor 41.

By controlling the oscillator circuit 24 in response to the amount of oscillator signal injected into the mixer circuit stage 18, the oscillator will draw only the necessary amount of current from the B+ supply to develop an oscillator frequency signal of the desired amplitude to provide proper mixing thereof within the mixer stage 18, and thus enhance the power saving capabilities of the receiver front end 10. This feature, together with the feature of common current flow between the RF amplifier transistor 30 and mixer transistor 36, enables the receiver front end circuit 10 to be operated with a B+ voltage supply of about 1 to 1½ volts, with a minimum of current being drawn from the power supply. The power supply may be a dry cell battery, or the like, and the receiver will operate for a longer period of time with a given type of battery than would a receiver of conventional design.

Figure 4:
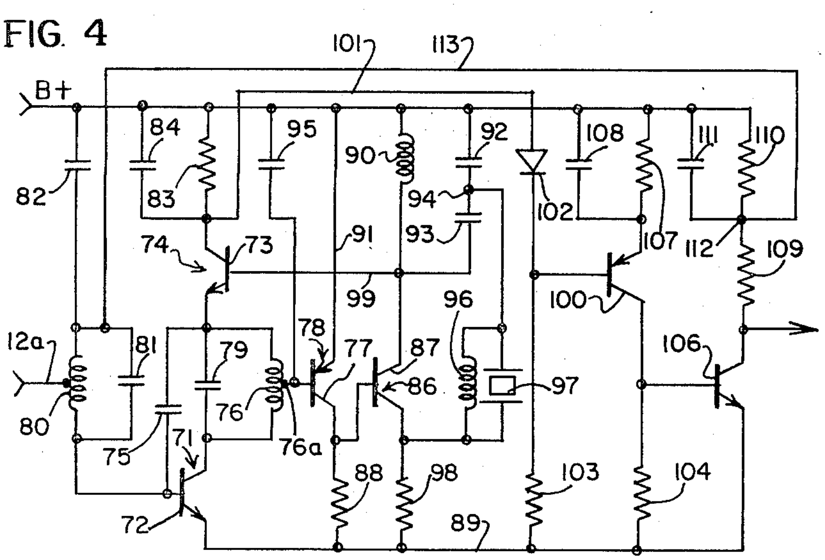
FIG. 4 illustrates an alternate embodiment of the receiver front end constructed in accordance with this invention.

The bias reference voltage applied to the base electrode of transistor 30 may be obtained from a separate reference voltage source which will set the level of operation of the receiver front end 10, or the bias reference voltage may be obtained by a voltage feedback from the IF amplifier stage 28 as illustrated in FIG. 4.

Referring to FIG. 4 there is seen an alternate embodiment of a receiver front end constructed in accordance with this invention and is here designated generally by reference numeral 70. Here also, an RF amplifier stage 71 has a transistor 72 with its load electrodes direct current coupled to the load electrodes of a transistor 73 within a mixer stage 74. This direct current coupling between the transistors 72 and 73 is preferably obtained via an inductance element 76 which has a tap **76*a*, which is bypassed for RF by capacitor 95, and is direct current coupled to the base electrode of a transistor 77 which forms an oscillator control circuit 78. Capacitor 75 provides neutralization of transistor 72**.

Connected in parallel with the inductance element 76 is a capacitor 79 which forms a tank circuit with the inductance element. The position of the tap **76*a* is selected to match the output impedance of the transistor 72 to the input impedance of the transistor 73 at the emitter electrode thereof. The base electrode of transistor 72 is direct current coupled to an input terminal 12*a* via a portion of an inductance element 80 which, together with a capacitor 81 forms a tank circuit tuned to the desired incoming RF frequency. In this instance also, capacitor 81 may be a variable capacitor, or inductance element 80 may be a variable inductance, to provide tuning of the tank circuit over a band of frequencies to be received by the receiver front end 70. A bypass capacitor 82 is connected between the tank circuit formed by inductance element 80 and capacitor 81** and the B+ terminal.

The collector electrode of transistor 73 of the mixer stage 74 is connected to B+ by a resistor 83 and a capacitor 84. This is in contrast to the tuned circuit at the output of the transistor 36 of FIG. 2. In this embodiment the resistor 83 serves a double function in the circuit as it provides a load for the mixer transistor 73, across which is developed the IF signal information, and also provides means for measuring and eventual control of the current flow through the mixer transistor 73 and RF amplifier transistor 72.

An oscillator circuit 86 includes a transistor 87, the base electrode of which is direct current coupled to the collector electrode of transistor 77 in the oscillator control circuit 78. The bias voltage for transistor 87 is developed across a resistor 88 connected in series with transistor 77 to a common line 89, which may be a common reference potential or ground potential. The collector electrode of transistor 87 is connected to the B+ line through an inductance element 90, and the base-emitter junction of transistor 77 is connected in parallel with the base-emitter junction of transistor 73 for low frequency and direct current signals via line 91 and the inductance element 90. Connected in parallel with inductance element 90 are a pair of capacitors 92 and 93 which are connected together at a circuit point 94 which, in turn, is connected to a tuned circuit comprising an inductance element 96 and a piezoelectric element 97, which form a fixed frequency oscillator with the transistor 87. The oscillator circuit 86 may be a variable frequecy oscillator circuit when the tuned circuit comprising inductance element 80 and capacitor 81 is also a variable frequency circuit so that the receiver front end 70 may track a given band of frequencies. Connected in series with the oscillator transistor 87 is a resistor 98, and the output of the oscillator circuit 70, i.e., the collector electrode of transistor 87, is direct current coupled to the base electrode of transistor 73 via line 99. This circuit arrangement provides the closed loop feedback for controlling the output of the oscillator circuit 86 as described hereinabove with regard to the receiver front end 10 of FIG. 2.

The IF signal information developed across resistor 83, at the output of mixer stage 74, is direct current coupled to the base electrode of a transistor 100 which forms a first IF amplifier stage within the receiver front end 70. This direct current coupling is over line 101 and through diode 102. Also connected to the junction of the base electrode of the transistor 100 and the cathode electrode of the diode 102 is a resistor 103. The transistor 100 provides a first stage of IF amplification by developing the IF signal across resistor 104, and applying this signal to the base electrode of a second IF amplifier transistor 106. The emitter electrode of the first IF amplifier transistor 100 is connected to the B+ supply through resistor 107, which is paralleled by bypass capacitor 108. The second IF amplifier transistor 106 has connected in series therewith a first resistor 109 which is connected in series with a second resistor 110, which in turn, is paralleled by a bypass capacitor 111. The resistors 109 and 110 provide a voltage divider network so that a voltage value developed at a circuit point 112 between the resistors can be direct current coupled back to the base electrode of transistor 72 at the RF amplifier stage 71 via line 113 and through the inductance element 60.

As previously stated, the voltage drop across resistor 83 provides a measure of the current flow through the series connected RF amplifier transistor 72 and the mixer transistor 73. This voltage is dropped by diode 102, which is matched to the base emitter drop of transistor 100. The voltage at the collector of transistor 100 is applied to the base of transistor 106 and controls the current through the resistors 109 and 110. Resistor 110 is bypassed by capacitor 111 and develops a bias voltage which is applied on conductor 113 and through inductance element 80 to the base of transistor 72. This direct current coupled feedback from the RF amplifier and mixer stages through the IF amplifier stages to the RF amplifier stage 71 provides means for controlling the overall current through the RF amplifier and mixer stages 71 and 74, respectively, while also providing an enhanced IF signal information signal to be applied to the IF utilization means, as illustrated in FIG. 1.

The receiver front end 70 in FIG. 4 operates substantially in the same manner as the receiver front end 10 of FIG. 2. That is, common current flow between the RF amplifier stage 71 and the mixer stage 74 occurs between the collector and emitter electrodes of the transistors in these stages and through an inductance element connected in series therewith. A tap on the inductance element 76 is direct current coupled to the base electrode of the oscillator control transistor 77 which, in turn, has its collector electrode direct current coupled to the base electrode of the oscillator transistor 87. The base-emitter junction of transistors 73 and 77 are connected in parallel one with the other with respect to a DC current path, and the output signal from the oscillator transistor 87 is direct current coupled to the base electrode of the mixer transistor 73.

The direct current circuit couplings between the various components of the receiver front end 70 is substantially the same as that shown in FIG. 3 with regard to the receiver front end 10. The only difference being that an additional stage of IF amplification is provided and direct current coupled feedback is provided between the second IF stage and the input of the RF amplifier stage. Also, in this embodiment, a diode is connected in series with the direct current coupling between the output of the mixer stage and the input of the IF amplifier transistor 100.

Accordingly, the receiver front ends 10 and 70, of the illustrated embodiments, provide a unique and novel circuit arrangement in which the interconnection between the various active circuit components of all of the stages are direct current coupled, thereby eliminating the need of AC coupling devices such as capacitors or transformers. Also, a substantial power saving is obtained by having a common current flow passing through the mixer stage and the RF amplifier stage and wherein oscillator current is minimized as a result of a direct current feedback loop created between the output of the oscillator and the input of the oscillator, which feedback signal is controlled in response to the amplitude of the signal injection at the input of the mixer stage. Accordingly, it will be understood that variations and modifications of this invention may be effected without departing from the spirit and scope of the novel concepts disclosed and claimed herein.

We claim:

1. In a receiver for receiving radio frequency signals at a signal input to be converted into intermediate frequency signals and applied to IF signal utilization means, and including a power supply to apply operating potential to the receiver, the combination including:

mixer means having first and second inputs and an output coupled to the IF signal utilization means;

means coupled to said first input of said mixer means for applying thereto a signal of a predetermined frequency which is different than the frequency of the radio frequency signals to combine therewith and develop the intermediate frequency signals;

RF amplifier means having an input for receiving the radio frequency signals from the signal input of the receiver and an output; and inductance means direct current coupled in series current relation between said output of said RF amplifier means and said second input of said mixer means to form a common current path from the power supply through said mixer means and said RF amplifier means.

2. The receiver of claim 1 wherein said mixer means includes a current control device having load electrodes and a control electrode, said load electrodes being arranged for receiving current from the power supply of the receiver, said RF amplifier means including a second current control device having a pair of load electrodes and a control electrode, said load electrodes of said second current control device being connected in series with the load electrodes of the current control device of the mixer means so that current from the power supply passes through the load electrodes of said mixer means and through the load electrodes of said RF amplifier means in series.

3. The receiver of claim 1 including a local oscillator circuit within the receiver for producing said signal of said predetermined frequency, said local oscillator circuit having an output thereof direct current coupled to said first input of said mixer means.

4. The receiver of claim 3 wherein said inductance means has a tap thereon, and including RF bypass means connecting said tap to a reference potential, and direct current coupling means connected between said tap and said oscillator circuit to control the output amplitude of said oscillator circuit in response to the amplitude of said predetermined frequency applied to said first input of said mixer means.

5. The receiver of claim 4 wherein said oscillator circuit includes a current control device having a control electrode, and said direct current coupling means between the tap on said inductance means and said oscillator circuit is connected to said control electrode of said current control device, and a bypass capacitor having one end thereof connected to the control electrode of said current control device and the other end thereof connected to the power supply of the receiver.

6. The receiver of claim 5 wherein said current control device is a transistor having a base-emitter junction thereof connected in parallel with the first and second inputs of said mixer means for direct current and rendered conductive to an extent determined by the radio frequency voltage between said first and second inputs of said mixer means to control the output amplitude of said oscillator circuit.

7. The receiver of claim 4 wherein the oscillator circuit includes a transistor having an output load electrode, and said mixer means includes a transistor having a base electrode which forms the first input of said mixer means, and means for direct current coupling said load electrode of said oscillator transistor to said base electrode of said mixer transistor.

8. The receiver of claim 1 wherein said mixer means includes a transistor having base, emitter and collector electrodes, with said collector electrode connected to the power supply of the receiver, and said emitter electrode direct current coupled to said RF amplifier means, and including an oscillator circuit including a transistor having a collector electrode direct current coupled to said base electrode of said transistor of said mixer means, and wherein said RF amplifier means includes a transistor having a collector electrode direct current coupled to said emitter electrode of said transistor of said mixer means, such that common current flows in series through the collector-emitter path of said transistor of said mixer means and the collector-emitter path of said transistor of said RF amplifier means.

9. The receiver of claim 8 including an oscillator control circuit having a transistor which has a base electrode direct current coupled to said tap on said inductance means and a collector electrode direct current coupled to the base electrode of said transistor in said oscillator circuit.

10. The receiver of claim 1 wherein said mixer means includes a transistor having a base electrode which forms said first input of said mixer means and an emitter electrode which forms said second input of said mixer means, and said inductance means includes an inductor having a tap at an intermediate point thereon, and including a control transistor having a base electrode direct current coupled to said tap on said inductor, said control transistor further having an emitter electrode connected to the power supply such that the DC paths through the base-emitter junctions of said transistor of said mixer means and said control are in parallel.

11. The receiver of claim 10 wherein said transistor of said mixer means is a high frequency transistor which develops a predetermined voltage across the base-emitter junction thereof when forward biased by a DC voltage, and said control transistor is a low frequency transistor which when forward biased by a DC voltage develops a voltage between the base-emitter junction thereof which is less than the voltage across the base-emitter junction of the transistor of said mixer means.

12. The receiver of claim 1 including an IF amplifier stage having a transistor with a base electrode direct current coupled to said output of said mixer means, a diode connected in series in the direct current coupling between said mixer means and said base electrode, and feedback means connected from the output of said IF amplifier stage to the input of said RF amplifier means.

13. The receiver of claim 1 wherein said inductance means is an inductor having a tap at an intermediate point thereon, a capacitor connected in parallel with said inductor to form a tank circuit to match the impedance of said output of said RF amplifier means to said second input of said mixer means, a control transistor having the base-emitter junction thereof connected in parallel with said first and second inputs of said mixer means to control the amplitude of said means coupled to said first input of said mixer means, said base electrode of said control transistor being direct current coupled to said tap on said inductor.

14. The receiver of claim 13 including a tank circuit formed by an inductance element and a capacitance element connected to said input of said RF amplifier means, said inductance element having a tap at an intermediate point thereon, means connecting the signal input means of said receiver to said tap on said inductance element, and bias voltage means connected to said tank circuit to be direct current coupled therethrough to said input of said RF amplifier means to control the operation of said RF amplifier means.

15. The receiver of claim 14 including an IF amplifier stage having an input direct current coupled to said output of said mixer means, and wherein said bias voltage means is coupled to said IF amplifier stage and derives a voltage therefrom which varies in accordance with the amplitude of the output signal of said IF amplifier stage which is applied to said tank circuit and to said input of said RF amplifier means.

16. In a receiver for receiving radio frequency signals at a signal input to be converted into intermediate frequency signals and applied to IF signal utilization means, the combination including:

local oscillator means for producing an output signal of a predetermined frequency which is different than the frequency of the radio frequency signals by a predetermined amount to combine therewith and develop the intermediate frequency signals;

mixer means having first and second inputs and an output, said output of said mixer means being adapted to be coupled to the IF signal utilization means;

coupling means connected between said local oscillator means and said first input of said mixer means for applying the output signal thereto, said second input of said mixer means being coupled to the input means of said receiver to receive the radio frequency signal therefrom; and oscillator control means coupled to said local oscillator means to control the amplitude of said output signal thereof, and connected to said mixer means and being rendered conductive in accordance with the amplitude of the signal applied to said first input of said mixer means.

17. The receiver of claim 16 wherein said oscillator control means includes a transistor having a base-emitter junction connected in parallel with said first and second inputs of said mixer means, the conductivity of which is controlled by the voltage between said first and second inputs.

18. The receiver of claim 16 wherein said mixer means includes a transistor having a base electrode forming said first input of said mixer means and an emitter electrode forming said second input of said mixer means, and said oscillator control means includes a transistor having a base electrode direct current coupled to said emitter electrode of said transistor of said mixer means and an emitter electrode direct current coupled to said base electrode of said transistor of said mixer means, such that DC paths through the base-emitter junctions of said transistor of said mixer means and said transistor of said oscillator control means are in parallel.

19. The receiver of claim 18 wherein said transistor of said mixer means is a high frequency transistor which develops a predetermined voltage across the base-emitter junction thereof when forward biased by a DC voltage, and said control transistor is a low frequency transistor which when forward biased by a DC voltage develops a voltage across the base-emitter junction thereof less than the voltage across the base-emitter junction of said transistor of said mixer means.

20. A receiver for receiving radiated radio frequency signals including in combination:

RF amplifier means for receiving the radio frequency signals from an input of the receiver and providing amplified radio frequency signals at an output of said RF amplifier means;

mixer means having first and second inputs and an output;

first means direct current coupling the output of said RF amplifier means in series current relation with said first input of said mixer means;

oscillator means for generating an output signal of predetermined frequency at an output of said oscillator means, said oscillator means having a control terminal;

second means direct current coupling said output signal from said oscillator means to said second input of said mixer means to cause said mixer means to develop an intermediate frequency signal;

an oscillator control circuit having an input and an output;

third means direct current coupling said output of said oscillator control circuit to said control terminal of said oscillator means; and fourth means direct current coupling said input of said oscillator control circuit to said first means along the direct current coupling between said RF amplifier means and said mixer means, whereby the interconnection between said RF amplifier means and said mixer means and between said oscillator control circuit and said oscillator means are formed by direct current couplings.

21. The receiver of claim 20 wherein said first means includes an inductance element having a tap thereon connected in series between said output of said RF amplifier means and said first input of said mixer means, and said fourth means couples said tap on said inductance element to said input of said oscillator control circuit to control the output amplitude of said oscillator circuit in response to the amplitude of said oscillator output signal applied to said second input of said mixer means.

22. The receiver of claim 21 wherein said oscillator control circuit includes a transistor having a control electrode, and said fourth means is connected to said control electrode, and including a bypass capacitor having one end thereof connected to said control electrode and the other end thereof adapted to be connected to a reference potential.

23. The receiver of claim 20 wherein said oscillator control circuit includes a transistor having a base-emitter junction connected in parallel with said first and second inputs of said mixer means, with said transistor being rendered conductive to a degree determined by the voltage between said first and second inputs of said mixer means to control the amplitude of said output signal of said oscillator circuit.

24. The receiver of claim 20 wherein said mixer means includes a transistor having a collector electrode connected to the power supply for the receiver, an emitter electrode direct current coupled to said RF amplifier means, said oscillator means includes a transistor having a collector electrode direct current coupled to the base electrode of said transistor of said mixer means, and said RF amplifier means includes a transistor having a collector electrode direct current coupled to said emitter electrode of said transistor of said mixer means, such that common current will flow through the collector-emitter path of said transistor of said mixer means and the collector-emitter path of said transistor of said RF amplifier means.

25. The receiver of claim 20 wherein said mixer means includes a transistor having a base electrode forming said second input of said mixer means and an emitter electrode forming said first input of said mixer means, and said oscillator control circuit includes a control transistor having a base electrode direct current coupled to said emitter electrode of said transistor of said mixer means and an emitter electrode direct current coupled to said base electrode of said transistor of said mixer means, such that the effective DC relationship of the base-emitter junction of said transistor in said mixer means and said transistor of said oscillator control circuit are in parallel.

26. The receiver of claim 25 wherein said transistor of said mixer means is a high frequency transistor which develops a predetermined voltage across the base-emitter junction thereof when forward biased by a DC voltage, and said transistor of said oscillator control circuit is a low frequency transistor which when forward biased by a DC voltage develops a voltage across the base-emitter junction thereof less than the voltage across the base-emitter junction of said transistor of said mixer means.

27. In a receiver for receiving RF signal information at a signal input of the receiver to be converted into IF signal information and applied to IF signal utilization means, the combination including:

- a mixer stage including a first current control device having control, common and output electrodes, said control electrode forming a first input of said mixer stage, and said common electrode forming a second input of said mixer stage;
- RF translating means connected between the signal input of the receiver and said second input of said first current control device to apply the RF signal information thereto;
- an oscillator circuit having input and output terminals, circuit means coupling said output terminal of said oscillator circuit to said first input of said first current control device to apply thereto an oscillator frequency signal to be combined with the RF signal information at said second input to produce the IF signal information at said output electrode of said first current control device;
- an oscillator control circuit including a second current control device having control, common and output electrodes, said output electrode of said second current control device being coupled to said input of said oscillator circuit, and said common electrode and said control electrode of said second current control device being connected in DC parallel relation with said first and second inputs of said mixer stage; and
- means in circuit with said first and second inputs of said mixer stage to provide a DC voltage across said first and second inputs thereof which is greater than the DC voltage between said control and common electrodes of said second current control device;
- said oscillator frequency signal at the output of said oscillator circuit which is injected into said first input of said mixer stage causing a decrease in voltage between said first and second inputs thereof to thereby cause the conduction of said second current control device to decrease and regulate the amplitude of the oscillator frequency signal.

28. The receiver of claim 27 wherein said first current control device of said mixing stage is a high frequency transistor having base, emitter and collector electrodes and is responsive to the RF signal information at the emitter electrode thereof, which forms second input of said mixer stage, said first current control device being further responsive to the oscillator frequency signal applied at said base electrode thereof, which forms said first input, to produce the IF signal information at said collector electrode, and said second current control device of said oscillator control circuit is a low frequency transistor connected to said oscillator circuit to control the bias supplied to said oscillator circuit thereby controlling the amplitude of the oscillator frequency signal applied to said base electrode of said high frequency transistor.

29. The receiver of claim 27 wherein the output of said oscillator circuit is direct current coupled to said control electrode of said first current control device, and said output electrode of said second current control device is direct current coupled to said input terminal of said oscillator circuit.

30. The receiver of claim 27 wherein the voltage between said first and second inputs of said mixer stage is reduced to a value equal to the voltage between said control and common electrodes of said second current control device upon the application of said oscillator frequency signal to said first input of said mixer stage.

31. A transistor circuit for amplifying a radio frequency signal and operating from a direct current power supply, including in combination,

- first and second transistors each having base, emitter and collector electrodes,
- resonant circuit means including inductor means and capacitor means connected in parallel and resonant at the frequency of the signal, said inductor means including first and second portions having a common junction, and means having low impedance at the frequency of the signal connecting said junction to a reference potential,
- direct current circuit means connecting said first and second transistors and said resonant circuit means to the power supply to provide a series direct current energizing path through said emitter and collector electrodes of said first transistor, said inductor means and said emitter and collector electrodes of said second transistor,
- first circuit means applying a radio frequency signal to said base electrode of said first transistor, and
- second circuit means connecting said base electrode of said second transistor to a reference potential, said second circuit means having a low impedance at the frequency of the signal,
- said resonant circuit means applying the signal from said collector electrode of said first transistor to said emitter electrode of said second transistor, said portions of said inductor means of said resonant circuit means being selected to match the impedance at said collector electrode of said first transistor to the impedance at said emitter electrode of said second transistor.

32. A transistor circuit in accordance with claim 31 including circuit means connected to said second transistor forming a mixer circuit therewith, and including means applying a local oscillator signal to said base electrode of said second transistor and means deriving an intermediate frequency signal from said collector electrode of said second transistors.

33. A transistor circuit in accordance with claim 31 further including local oscillator means for providing a local oscillator signal, control means for said local oscillator means coupled to said inductor means for controlling the amplitude of the local oscillator signal in accordance with the signal in said inductor means, circuit means connecting said local oscillator means to one of said first and second transistors for applying said local oscillator signal thereto, whereby said local oscillator signal is mixed with the radio frequency signal to produce an intermediate frequency signal.

34. The transistor circuit of claim 31 further including neutralizing capacitor means connected from said emitter electrode of said second transistor to said base electrode of said first transistor.

* * * * *